(12) United States Patent
Suzuki et al.

(10) Patent No.: US 7,456,535 B2
(45) Date of Patent: Nov. 25, 2008

(54) THRUST MEMBER ATTACHED TO OUTER SURFACE OF MOTOR BODY, AND MOTOR INCLUDING SAME

(75) Inventors: Yuzuru Suzuki, Shizuoka (JP); Taketoshi Ohyashiki, Shizuoka (JP)

(73) Assignee: Minebea Co., Ltd., Nagano (JP)

( * ) Notice: Subject to any disclaimer, the term of this patent is extended or adjusted under 35 U.S.C. 154(b) by 147 days.

(21) Appl. No.: 10/787,016

(22) Filed: Feb. 24, 2004

(65) Prior Publication Data

US 2004/0164631 A1 Aug. 26, 2004

(30) Foreign Application Priority Data

Feb. 26, 2003 (JP) ............... 2003-050098

(51) Int. Cl.
*H02K 5/16* (2006.01)
*H02K 7/08* (2006.01)

(52) U.S. Cl. .................. 310/90; 384/295; 384/224

(58) Field of Classification Search .................. 310/90; 384/285, 245, 202, 223, 224, 228, 231, 295, 384/204

See application file for complete search history.

(56) References Cited

U.S. PATENT DOCUMENTS

| | | | | |
|---|---|---|---|---|
| 1,586,450 A | * | 5/1926 | Lange et al. | 384/223 |
| 2,938,755 A | * | 5/1960 | Lee et al. | 384/204 |
| 3,794,869 A | * | 2/1974 | Apostoleris | 310/90 |
| 3,836,214 A | * | 9/1974 | Gengard et al. | 384/245 |
| 4,616,940 A | * | 10/1986 | DeBruyn | 384/248 |
| 5,811,903 A | | 9/1998 | Ueno et al. | |
| 5,945,756 A | * | 8/1999 | Periyathamby et al. | 310/89 |
| 6,208,046 B1 | * | 3/2001 | Lee | 310/49 R |
| 6,577,035 B2 | * | 6/2003 | Coyac et al. | 310/90 |
| 6,698,933 B2 | * | 3/2004 | Lau | 384/420 |
| 2002/0140303 A1 | | 10/2002 | Mayumi | |

FOREIGN PATENT DOCUMENTS

| | | |
|---|---|---|
| EP | 0868009 A1 | 9/1998 |
| EP | 1091469 A2 | 4/2001 |
| JP | 49-46003 | 12/1974 |
| JP | 61-109437 | * 5/1986 |
| JP | H04-134163 | 12/1992 |
| JP | 09-135562 | 5/1997 |
| JP | 10-066294 | 3/1998 |
| JP | 11-275848 | 3/1998 |
| JP | 10-290548 | 10/1998 |
| JP | 10271753 A | * 10/1998 |
| JP | 11-117934 | 4/1999 |
| JP | 2001-050251 | 2/2001 |
| JP | 2001-309610 | 11/2001 |

OTHER PUBLICATIONS

Decision of Refusal; Japanese Patent Application No. 2003-050098; Aug. 7, 2007 with English Translation.

* cited by examiner

*Primary Examiner*—Karl I Tamai
(74) *Attorney, Agent, or Firm*—Townsend and Townsend and Crew LLP

(57) ABSTRACT

Cutouts are formed in a front end plate disposed of a motor body. A thrust member, which has a hump segment to touch and press against a rear end surface of a rotary shaft frontward, is detachably attached to the motor body such that distal ends of arm segments of the thrust member are fitted into respective cutouts of the front end plate.

9 Claims, 3 Drawing Sheets

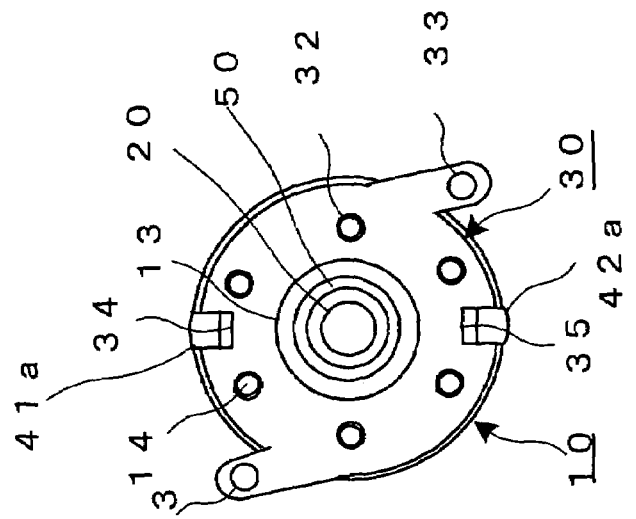
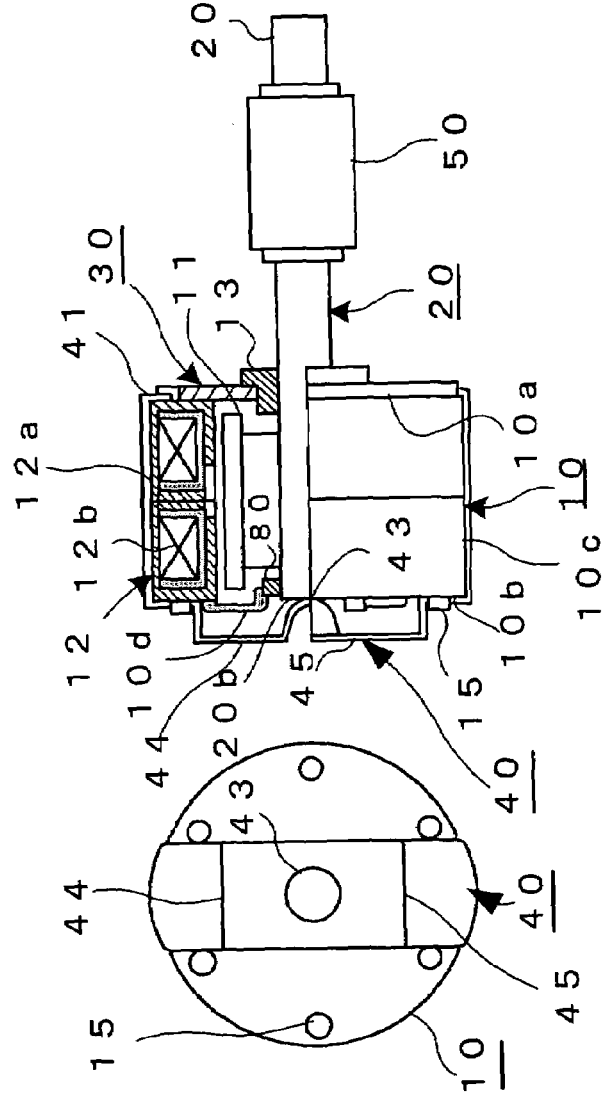
FIG. 1A
FIG. 1B
FIG. 1C

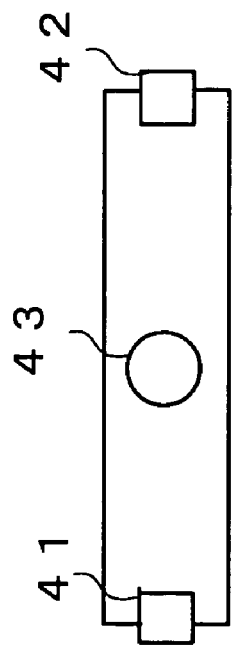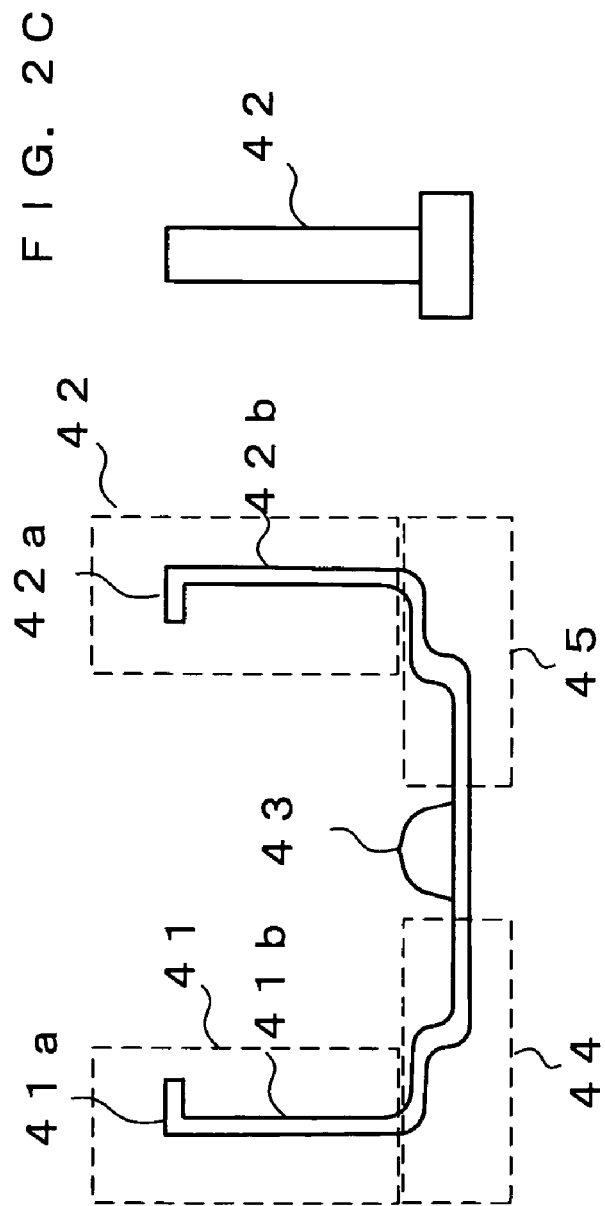

THRUST MEMBER ATTACHED TO OUTER SURFACE OF MOTOR BODY, AND MOTOR INCLUDING SAME

BACKGROUND OF THE INVENTION

1. Field of the Invention

The present invention relates to a thrust member of a motor, which is attached to an outer surface of a motor body, and which presses against a rear end face of a rotary shaft, and further to a motor provided with such a thrust member.

2. Description of the Related Art

A worm gear may be attached onto a rotary shaft of a motor, such as a stepping motor, so as to rotate a worm wheel at an appropriate reduction ratio. However, when a worm gear is attached onto a rotary shaft and meshes with an outside gear, such as a worm wheel, for speed reduction, the rotary shaft receives a large axial force. The direction of the axial force is reversed when the motor reverses its rotation direction. Since a stepping motor is usually given with an axial play on its rotor, it is necessary to prevent axial movement of the rotor fixedly attached onto the rotor shaft. Preventive measures to prohibit the rotor from axially moving are disclosed in, for example, Unexamined Japanese Patent Application KOKAI Publication No. H10-290548, Unexamined Japanese Patent Application KOKAI Publication No. 2001-309610, and Unexamined Japanese Utility Model Application KOKAI Publication No. H04-134163.

Unexamined Japanese Patent Application KOKAI Publication No. H10-290548 discloses a small motor which has a coil spring disposed thereinside adjacent to its rear end wall, and which presses its rotary shaft frontward. In this connection, the coil spring may be replaced by a plate spring. A coil or plate spring attached inside a motor generates only a small force to press a rotary shaft frontward, which cannot successfully counter an axial force of a rotary shaft moving rearward by means of a worm gear meshing with an outside gear. In this case, the rotor hits against a bearing, which supports the rearward portion of the rotary shaft, or hits against other members, thereby generating axial vibration. Also, since the rotor makes surface contact with the bearing or other members when hitting against them, torque is decreased due to friction generated by the surface contact. Further, in case of a stepping motor, the axial vibration is generated every time when a stepping motion is made. The spring force of the coil or plate spring can be increased in order to duly counter the rearward moving force of the rotary shaft. This, however, causes torque to decrease due to the very increase of the spring force, when the rotary shaft is not moved axially, for example, when the worm gear is not attached.

Unexamined Japanese Patent Application KOKAI Publication No. 2001-309610 discloses a motor attaching structure in which the front end portion of a rotary shaft having a worm gear attached there-onto is blocked so as to inhibit the worm gear from coming off from the rotary shaft, and Unexamined Japanese Utility Model Application KOKAI Publication No. H04-134163 discloses a gear case which is attached to the front end portion of a rotary shaft and inhibits axial movement of the rotary shaft. These approaches, however, help only when the rotary shaft rotates in one direction so as to be moved frontward by means of a worm gear, and are of no help when the rotary shaft reverses its directional direction so as to be moved rearward by the worm gear, and additional approaches are needed thus complicating the structure of the motor.

SUMMARY OF THE INVENTION

The present invention has been made in light of the above problems, and it is an object of the present invention to prohibit a rotary shaft of a motor from axially moving in a rearward direction without complicating the motor structure.

In order to achieve the object, according to a first aspect of the present invention, a thrust member is attached to a motor including a motor body which is shaped substantially cylindrical, and a rotary shaft which has a front end portion thereof sticking out from a front end face of the motor body, has a rear end face thereof exposed at a rear end face of the motor body, and which rotates with respect to the motor body. The thrust member comprises: a plurality of arm segments attached to predetermined areas of an outer surface of the motor body; a hump segment to touch the rear end face of the rotary shaft when the thrust member is mounted on the motor with the arm segments being attached to the predetermined areas on the outer surface of the motor body; and a plurality of shoulder segments to bridge the arm segments and the hump segment and to urge the hump segment toward the rotary shaft.

In the first aspect of the present invention, the rotary shaft may have a worm gear attached to its front end portion.

In the first aspect of the present invention, the arm segments may be attached to the front end face of the motor body.

In the first aspect of the present invention, the arm segments may be detachably attached at the predetermined areas of the motor body.

In the first aspect of the present invention, the arm segments may be fixedly attached to the predetermined areas of the motor body.

According to a second aspect of the present invention, a motor comprises: a rotary shaft; and a motor body which is shaped substantially cylindrical, which includes a rotor that is fixedly attached to a predetermined area of the rotary shaft, and a stator that is shaped hollow-cylindrical, and that houses the rotor and acts on the rotor in a non-contact manner so as to cause the rotor to rotate around the rotary shaft as an axis, wherein the rotary shaft has a front end portion thereof sticking out from a front end face of the motor body, and has a rear end face thereof exposed at a rear end face of the motor body. The motor body has a thrust member receiving mechanism formed at its outer surface, and a thrust member, which includes a hump segment to touch the rear end face of the rotary shaft, and which urges the hump segment toward the rotary shaft, is attached to the thrust member receiving mechanism.

In the second aspect of the present invention, the thrust member may be detachably attached.

In the second aspect of the present invention, the thrust member may be fixedly attached.

In the second aspect of the present invention, the thrust member receiving mechanism may be provided at the front end face of the motor body.

In the second aspect of the present invention, the thrust member receiving mechanism may be constituted by cutouts formed at the front end face of the motor body.

In the second aspect of the present invention, the motor body may have, at its outer surface, an embossed or recessed guiding mechanism, to which portions of the thrust member are fitted.

According to a third aspect of the present invention, a motor comprising: a rotary shaft; a motor body which is shaped substantially cylindrical, and which includes a rotor that is fixedly attached to a predetermined area of the rotary shaft, and a stator that is shaped hollow-cylindrical, and that houses the rotor and acts on the rotor in a non-contact manner so as to cause the rotor to rotate around the rotary shaft as an axis, wherein the rotary shaft has a front end portion thereof sticking out from a front end face of the motor body, and has a rear end face thereof exposed at a rear end face of the motor body; and a thrust member. The thrust member includes a plurality of arm segments attached to predetermined areas on an outer surface of the motor body, a hump segment to touch the rear end face of the rotary shaft, and a plurality of shoulder segments to bridge the arm segments and the hump segment and to urge the hump segment toward the rotor.

In the third aspect of the present invention, the rotary shaft may have a worm gear attached to its front end portion.

BRIEF DESCRIPTION OF THE DRAWINGS

The above object and other advantages of the present invention will become more apparent by describing in detail the preferred embodiments of the present invention with reference to the attached drawings in which:

FIGS. 1A, 1B and 1C show a stepping motor including a thrust member according to a first embodiment of the present invention, respectively representing its front, side (partly sectioned) and rear views;

FIGS. 2A, 2B and 2C show the thrust member shown in FIGS. 1A to 1C, respectively representing its plan, front and side views.

DETAILED DESCRIPTION OF THE PREFERRED EMBODIMENTS

First Embodiment

Figure 3A:
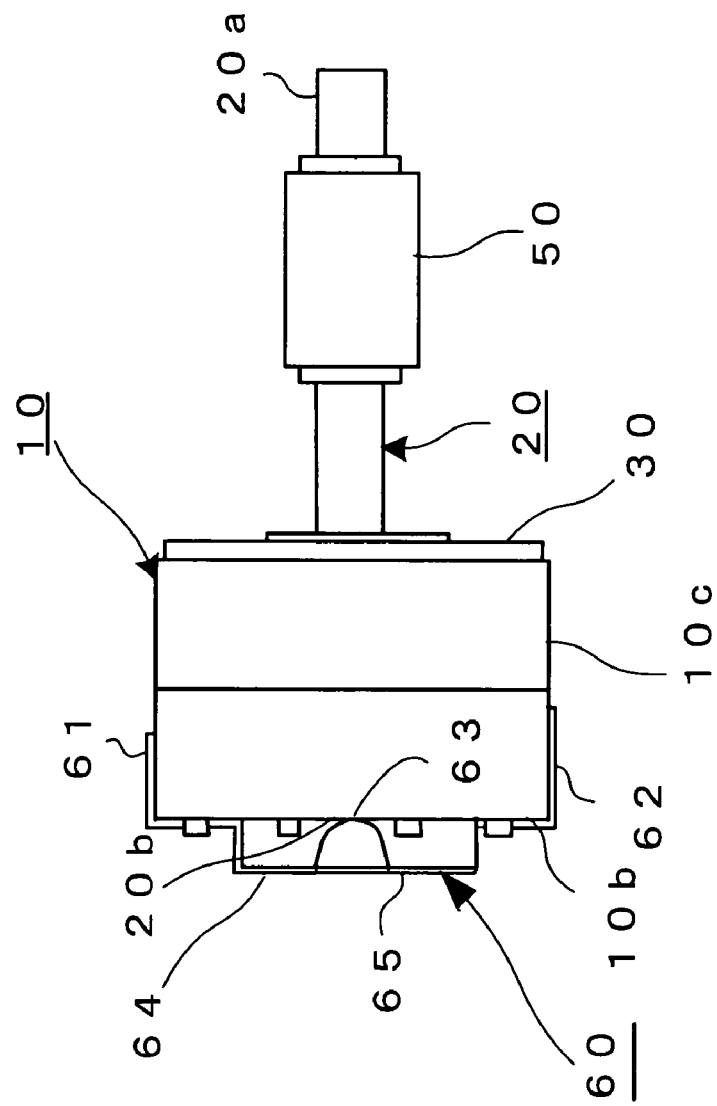
FIGS. 3A and 3B show a stepping motor including a thrust member according to a second embodiment of the present invention, respectively representing its side and rear view.

A first embodiment of the present invention will be described with reference to FIGS. 1A to 1C. A stepping motor shown in FIGS. 1A to 1C generally comprises a motor body 10, and a rotary shaft 20.

The motor body 10 includes a rotor 11 shaped cylindrical, and a stator 12 shaped hollow-cylindrical. The rotor 11 has a ring-shaped magnet constituting an outer circumference thereof, and is fixedly attached to a prescribed portion of the aforementioned rotary shaft 20 which is inserted through the center of the rotor 11. The stator 12 has a plurality of stator yokes 12a formed of a soft magnetic steel sheet, has a plurality of windings 12b responsible for exciting the stator yokes 12a, rotatably houses the rotor 11 with a gap therebetween, and magnetically causes in a non-contact manner the rotor 11 to rotate.

A frontward end portion 20a of the rotary shaft 20 sticks out from a front end face 10a of the motor body 10, and a rear end face 20b of the rotary shaft 20 is exposed at a rear end face 10b of the motor body 10. A front end plate 30 is attached to the front end face 10a of the motor body 10, and a plurality (six in the figure) of positioning bosses 14 formed of resin are arranged in a circle at a regular interval at the front end face 10a of the motor body 10. A plurality (six in the figure) of guide bosses 15 formed of resin are arranged in a circle at a regular interval at the rear end face 10b of the motor body 10. A rear end plate 10d is disposed at the rear end face 10b and holds a bearing 80. Coil terminals (not shown) for providing current to the windings 12b are disposed at an outer circumference 10c of the motor body 10. A thrust member 40 is detachably attached to the motor body 10, and a worm gear 50 is attached to a portion of the rotary shaft 20 toward the front end portion 20a.

The front end plate 30 is for attaching the motor body 10 to an apparatus (not shown) and is formed of a stainless steel plate. A bearing 13 is attached to the center of the front end plate 30 and rotatably supports the rotary shaft 20. The front end plate 30 has a plurality (six in the figure) of positioning holes 32 formed so as to be arranged at a regular interval in a circle concentric with the bearing 13, and also has two lug holes 33. The front end plate 30 further has two cutouts 34, 35 functioning as thrust member receiving mechanism. The front end plate 30 is fixedly attached to the front end face 10a of the motor body 10, for example, by welding such that the positioning bosses 14 of the motor body 10 fit respectively into the positioning holes 32 of the front end plate 30. The motor body 10 with the front end plate 30 attached thereto as described above is attached to an apparatus (not shown) by means of, for example, screws going through the lug holes 33 and driven into the apparatus. The aforementioned coil terminals (not shown) can be appropriately oriented by selectively changing the mating combination of the positioning bosses 14 and holes 32.

The thrust member 40 will be described in details with reference to FIGS. 2A to 2C. The thrust member 40 is formed by stamping and bending, for example, a stainless steel sheet, and comprises two arm segments 41, 42, a hump segment 43, and two shoulder segments 44, 45 to bridge respective arm segments 41, 42 and the hump segment 43. The arm segments 41, 42 have their respective distal portions 41a, 42a bent inwardly (toward each other), and the thrust member 40 is attached to the motor body 10 such that the distal portions 41a, 42b bent toward each other are fitted respectively into the cutouts 34, 35 of the front end plate 30 attached to the motor body 10. When the thrust member 40 is attached to the motor body 10 as described above, main portions 41b, 42b of the arm segments 41, 42 are in contact with the outer circumference 10c of the motor body 10. The hump segment 43 is domed inwardly, that is, toward the rotor 11 and makes a nearly point-contact with the rear end face 20b of the rotary shaft 20 when the thrust member 40 is attached to the motor body 10. The shoulder segments 44, 45 are bent for elasticity so as to urge the hump segment 43 toward the rear end face 20b of the rotary shaft 20, and the width of at least one area of the shoulder segments 44, 45 is dimensioned equal to a clearance distance between two adjacent guide bosses 15 so as to fit there-between for guidance purpose.

Referring back to FIGS. 1A to 1C, discussion will be made on the actuation of the stepping motor which has the worm gear 50 attached onto the rotary shaft 20 thereof and which has the thrust member 40 attached to the motor body 10 thereof. When current is provided to the coil terminals (not shown) and flows in the windings 12b, the stator yokes 12a are selectively excited, which causes magnetically and in a non-contact manner the rotor 11 to rotate, and the rotary shaft 20 fixedly attached to the rotor 11 is rotated together in the same direction. Thus, the worm gear 50 rotates along with the rotary shaft 20, and an outside gear (not shown) meshing with the worm gear 50 rotates thereby generating force acting axially on the rotary shaft 20. When the rotary shaft 20 reverses its rotational direction, the worm gear 50 reverses its rotational direction, and the direction of the force acting axially on the rotary shaft 20 is reversed.

When the worm gear 50 rotates in a direction so as to generate axial force urging the rotary shaft 20 rearward (toward the rear end face 20b), the rotary shaft 20 is held from moving rearward by means of the thrust member 40 resiliently pressing the rear end face 20b of the rotary shaft 20 frontward. Thus, the rotor 11 is prevented from touching the rear end plate 10d or the bearing 80.

The stepping motor provided with the thrust member 40 according to the first embodiment of the present invention has the following advantages:

(1) Since the rotor 11 and the rotary shaft 20 are prevented from moving rearward regardless of the rotation direction of the worm gear 50, no abnormal noise is generated;

(2) Since the thrust member 40 is attached to the outside of the motor body 10, the shoulder segments 44, 45 can be given with an ample urging force thereby securely preventing the rotor 11 and the rotary shaft 20 from moving rearward;

(3) Since the thrust member 40 is detachably attached to the motor body 10, the thrust member 40 can be removed when the worm gear 50 is not attached onto the rotary shaft 20, thereby eliminating the friction between the thrust member 40 and the rotary shaft 20 resulting in prevention of reduction in the motor torque; and (4) Since part of each of the shoulder segments 44, 45 is fitted between two adjacent guide bosses 15 on the rear end face 10b of the motor body 10, the thrust member 40 is properly and securely set thereby enabling the hump segment 43 to surely touch the rear end face 20b of the rotary shaft 20.

Second Embodiment

A second embodiment of the present invention will be described with reference to FIGS. 3A and 3B. In the first embodiment, the thrust member 40 is attached to the motor body 10 such that the distal portions 41a, 42a of the arm segments 41, 42 bent toward each other are fitted respectively into the cutouts 34, 35 of the front end plate 30. The second embodiment discusses one of alternative ways of attaching a thrust member to a motor body.

Figure 3B:
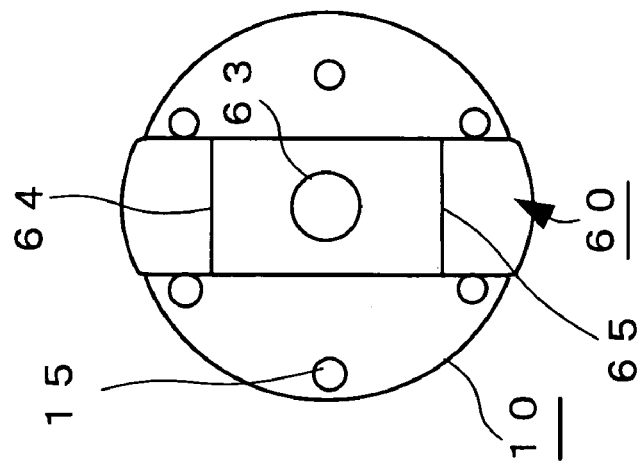

Referring to FIGS. 3A and 3B, a stepping motor including a thrust member according to the second embodiment comprises a motor body 10, and a rotary shaft 20, which are identical with those of the first embodiment, and a worm gear 50 is attached to an exposed portion of the rotary shaft 20 toward a front end portion 20a. The stepping motor further includes a thrust member 60. The thrust member 60 is formed of a stainless steel sheet stamped and bent, and comprises two arm segments 61, 62, a hump segment 63, and two shoulder segments 64, 65 to bridge respective arm segments 61, 62 and the hump segment 63. The arm segments 61, 62, unlike the arm segments 41, 42 in the first embodiment, do not have their distal portions bent, and are shorter than the arm segments 41, 42. The hump segment 63 and the shoulder segments 64, 65 are structured similar to those of the first embodiment.

The thrust member 60 is fixedly attached to the motor body 10 such that the arm segments 61, 62 are fixed to an outer circumference 10c of the motor body 10, for example, by welding. The shoulder segments 64, 65 urge the hump segment 63 so as to press against a rear end face 20b of the rotary shaft 20 frontward (toward the front end portion 20a). Thus, the second embodiment provided with the thrust member 60 enjoys the aforementioned advantages (1), (2) and (4) of the first embodiment provided with the thrust member 40, and has another advantage in that the arm segments 61, 62 of the thrust member 60 are smaller and simpler than the arm segments 41, 42 of the thrust member 40.

While the present invention has been illustrated and explained with respect to specific embodiments thereof, it is to be understood that the present invention is by no means limited thereto but encompasses all changes and modifications within the scope of the present invention. For example:

(a) The thrust members 40, 60 may be attached to other type motors than a stepping motor;

(b) The thrust members 40, 60 may be attached, if the rotary shaft 20 is anticipated to move rearward for some reason even when the worm gear 50 is not put on the rotary shaft 20;

(c) The distal portions 41a, 42a of the arm segments 41, 42 of the thrust 40 may be fitted into recesses or cavities formed at appropriate areas of the stator 12, instead of the cutouts 34, 35 of the front end plate 30; and (d) The guide bosses 15 may be replaced by grooves or recesses adapted to guide the thrust members 40, 60.

The scope of the invention is, therefore, indicated by the appended claims rather than by the foregoing description.

This application is based on Japanese Patent Application No. 2003-50098 filed on Feb. 26, 2003 and including specification, claims, drawings and summary. The disclosure of the above Japanese Patent Application is incorporated herein by reference in its entirety.

What is claimed is:

1. A motor comprising:
    a cylindrical motor body comprising a hollow cylindrical stator, a front end plate, a front end face, and a rear end plate having guide bosses;
    a rotor being fixedly attached to a rotary shaft wherein the rotary shaft has a front end portion that sticks out of the front end face of the motor body;
    a thrust member which is detachably attached to the motor body utilizing the guide bosses, the thrust member formed by stamping and bending a metal sheet, the thrust member comprising:
    at least two arm segments attached to predetermined areas on an outer surface of the motor body;
    a hump segment to touch the rear end face of the rotary shaft, the hump segment being shaped such that it prohibits the rotary shaft only from axially moving in a rearward direction when the thrust member is mounted on the motor with the arm segments being attached to the predetermined areas on the outer surface of the motor body; and
    at least two shoulder segments to bridge the arm segments and the hump segment and to urge the hump segment toward the rotary shaft, wherein distal portions of the arm segments are inwardly bent and fitted into cutouts on the front end plate.

2. The motor according to claim 1, wherein the rotary shaft has a worm gear attached to the front end portion thereof.

3. The motor according to claim 1, wherein the arm segments are attached to the front end face of the motor body.

4. The motor according to claim 1, wherein the arm segments are detachably attached to the predetermined areas of the motor body.

5. The motor according to claim 1, wherein the arm segments are fixedly attached to the predetermined areas of the motor body.

6. The motor according to claim 1, wherein the thrust member receiving mechanism is provided at the front end face of the motor body.

7. The motor according to claim 6, wherein the thrust member receiving mechanism is constituted by cutouts formed at the front end face of the motor body.

8. The motor according to claim 1, wherein the motor body has, at the outer surface thereof, an embossed guiding mechanism, to which portions of the thrust member are fitted.

9. The motor according to claim 1, wherein the motor body has, at the outer surface thereof, a recessed guiding mechanism, to which portions of the thrust member are fitted.

* * * * *